L. P. HALLADAY.
ATTACHMENT FOR BUMPER SUPPORTS.
APPLICATION FILED APR. 15, 1920.

1,364,878.

Patented Jan. 11, 1921.
2 SHEETS—SHEET 1.

Witness.
Edward T. Wray.

Inventor.
Lewis P. Halladay.
by Parker Carter
Attorneys

L. P. HALLADAY.
ATTACHMENT FOR BUMPER SUPPORTS.
APPLICATION FILED APR. 15, 1920.
1,364,878.
Patented Jan. 11, 1921.
2 SHEETS—SHEET 2.
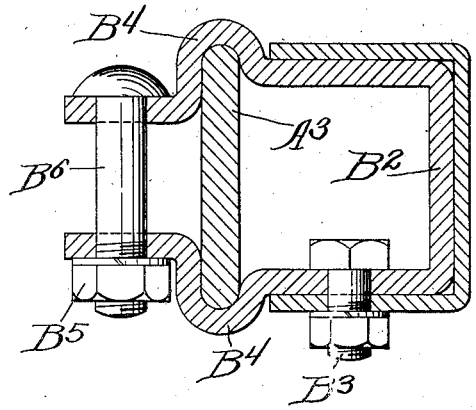
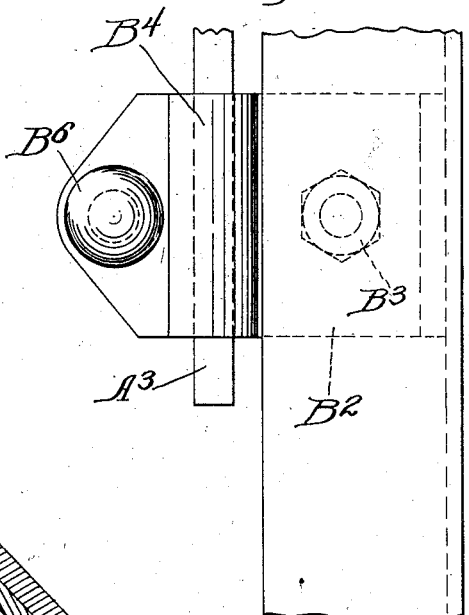
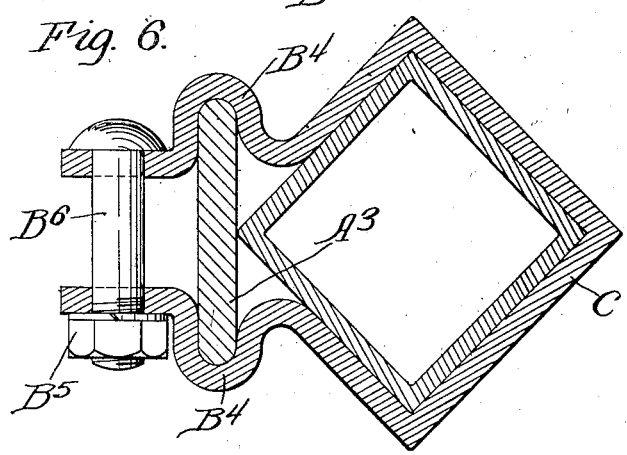
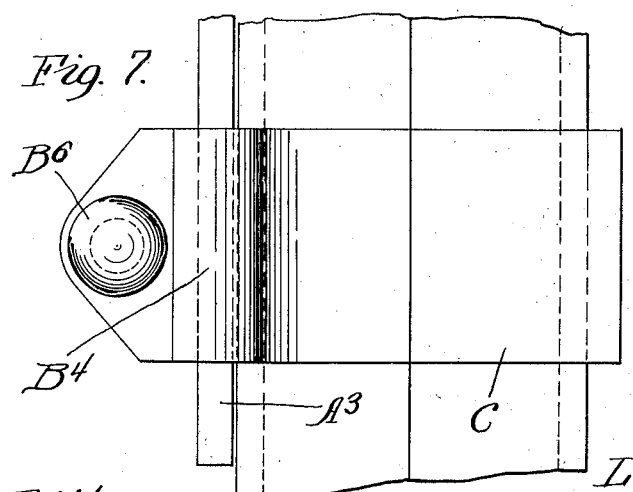
Witness.
Edward T. Wray.
Inventor.
Lewis P. Halladay
by Parker & Cole
Attorneys.

UNITED STATES PATENT OFFICE.

LEWIS P. HALLADAY, OF STREATOR, ILLINOIS.

ATTACHMENT FOR BUMPER-SUPPORTS.

1,364,878.       Specification of Letters Patent.       Patented Jan. 11, 1921.

Application filed April 15, 1920. Serial No. 374,070.

*To all whom it may concern:*

Be it known that I, LEWIS P. HALLADAY, a citizen of the United States, residing at Streator, in the county of La Salle, and State of Illinois, have invented certain new and useful Improvements in Attachments for Bumper-Supports, of which the following is a specification.

My invention relates to improvements in bumper bar clamp supports and has for one object to provide a new and improved form of clamp by which with one and the same support or bumper bracket or carrying bar, every conceivable type of bumper impact bar may be supported.

It will be understood that the bumper impact bar may be channel or T or diamond or square or round or diamond channel or any other conceivable form or shape depending on the whim of the owner or the available material or the character of the car, and I have provided a type of bracket which with the use of a certain minimum number of special bumper bar engaging yokes, or clamps may be used to support all kinds of bars.

My invention is illustrated more or less diagrammatically in the accompanying drawings wherein:

Fig. 4 is a section showing a different type of bumper bar held in place;

Fig. 5 is a plan view of Fig. 4;

Fig. 6 is a section through a third form;

Fig. 7 is a plan view of Fig. 6;

Like parts are indicated by like characters throughout the drawings.

Figure 1:
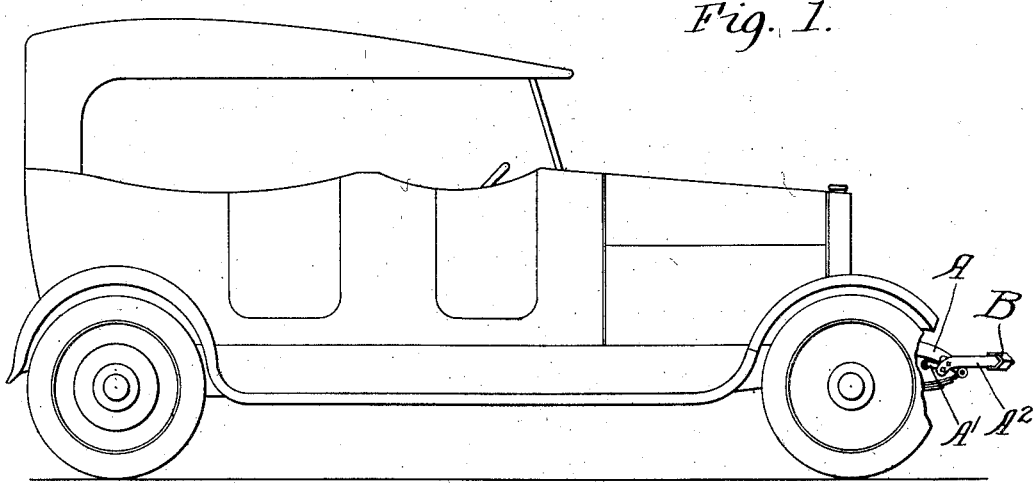
Figure 1 is a side elevation of an automobile showing my bumper bracket and supporting bar in place with one type of automobile impact bumper bar held in the working position.
Figure 3:
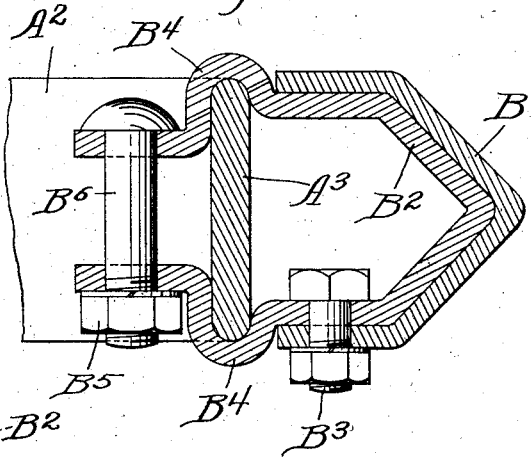
Fig. 3 is a section along the line 3 3 of Fig. 2.
Figure 2:
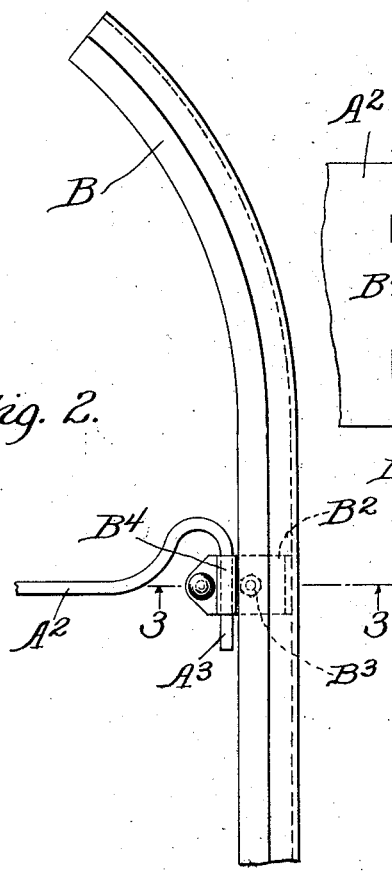
Fig. 2 is a detail plan view of the bumper bar and supporting bar.

A is an automobile side frame, attached to it is a bracket A', and attached to this bracket is a bumper supporting bar $A^2$. This bumper supporting bar is substantially parallel with the frame and therefore, takes any impact in compression only. The end of this bar is bent at right angles to the body and to the axis of the frame as indicated at $A^3$.

B is a so called diamond channel bar, the pointed portion extending forwardly. This bar is supported near both ends on the two bumper supporting bars by means of the clamps $B^2$ which conform to the inner size and shape of the bar and are bolted to the bar by means of bolts $B^3$. This clamp is generally U shaped as indicated made out of flat bent stock there being two outwardly bent portions $B^4$ $B^4$ one in each arm of the U and immediately adjacent the rear edge of the bumper bar. The transverse bent portion of the bumper supporting bar is engaged by these members $B^4$ $B^4$, and when the nut $B^5$ is tightened down on the screw $B^6$, this clamp will be rigidly tightened on the bumper supporting bar.

The device shown in Fig. 4 is exactly the same except that the clamp is rectangular instead of pointed to engage the U shaped channel beam.

The situation is the same in Fig. 6 except that the clamp C has a square portion to engage the square bar going around the outside of it, the bar and the bumper supporting bar being both therefore, under compression when the holding bolt is tightened up.

Of course this type of clamp with greater or lesser modifications would be suitable for supporting any bumper bar, and no conceivable bar could be made which could not be clamped by some simple modification of form of the clamp here indicated.

It will be evident that while I have only shown a few selective types, still many changes might be made in size, shape, or arrangement of parts without departing materially from the spirit of my invention, and I wish therefore, that my drawings be regarded as in a sense diagrammatic.

The use and operation of my invention are as follows:

In applying a bumper embodying my invention, the bumper brackets are first attached to the automobile frame. The bumper supporting bars may then be mounted on the brackets and adjusted to the proper position to hold the impact bumper bar in its desired position and the transversely bent ends of the bumper supporting bars may extend inwardly or outwardly as the case may be. The bumper clamp is then loosely slipped onto the bent ends of the bumper supporting bars and the bumper impact bar is then mounted on the clamps either by means of the bolts and nuts as shown or by threading the clamp onto the solid bar. The clamps are then adjusted longitudinally along the bent ends of the holding bars until the parts are in the proper position. The parts are then all tightened up and the tightening of the clamp on the bumper supporting bar will exert such a powerful force that the bumper bar itself will be rigidly locked in proper adjusted position on the automobile frame.

Claims.

1. A clamp for automobile bumper bars comprising a loop member adapted to conform to the contour of the bumper bar, and also to separately conform to and engage a bumper support and means for locking the clamp in holding position both on the bumper bar and the support.

2. A clamp for automobile bumper bars comprising a loop member adapted to conform to the contour of the bumper bar, and also to separately conform to and engage a bumper support and means for locking the clamp in holding position both on the bumper bar and the support, and separate means for attaching the clamp to the bumper bar.

3. A clamp for automobile bumper bars comprising a loop member adapted to conform to the contour of the bumper bar, and also to separately conform to and engage a bumper support and means for locking the clamp in holding position both on the bumper bar and the support, the clamp being shaped to engage and hold the bumper support at a point immediately in rear of its engagement with the bumper bar.

4. A clamp for automobile bumper bars comprising a loop member adapted to conform to the contour of the bumper bar, and also to separately conform to and engage a bumper support and means for locking the clamp in holding position both on the bumper bar and the support, and separate means for attaching the clamp to the bumper bar, the clamp being shaped to engage and hold the bumper support at a point immediately in rear of its engagement with the bumper bar.

5. A clamp for automobile bumper bars comprising a loop member adapted to engage the bumper bar, opposed sides of said loop member being bent to form pockets removed from the bumper bar, the pockets adapted to engage the edges of a flat bumper support.

6. A clamp for automobile bumper bars comprising a loop member adapted to engage the bumper bar, opposed sides of said loop member being bent to form pockets removed from the bumper bar, the pockets adapted to engage the edges of a flat bumper support, and means adjacent such pockets to draw the clamp sides together to lock the support in said pockets.

7. A clamp for automobile bumper bars comprising a loop member adapted to engage the bumper bar, opposed sides of said loop member being bent to form pockets removed from the bumper bar, the pockets adapted to engage the edges of a flat bumper support, and means adjacent such pockets to draw the clamp sides together to lock the support in said pockets, said means being adapted also to lock the clamp on the bumper bar.

8. In an automobile bumper, a flat bumper bar supporting member extending forwardly from the automobile frame and of greater height than thickness, the end of said member being bent into perpendicularity to the axis of the vehicle, a rigid bumper bar mounted on the bent end of the bumper support, a clamp gripping such support and separately supporting the bumper bar.

9. In an automobile bumper, a flat bumper bar supporting member extending forwardly from the automobile frame and of greater height than thickness, the end of said member being bent into perpendicularity to the axis of the vehicle, a rigid bumper bar mounted on the bent end of the bumper support, a clamp gripping such support and supporting the bumper bar, and separate means for locking the clamp in position on the bar and on the support.

10. In an automobile bumper, a flat bumper bar supporting member extending forwardly from the automobile frame and of greater height than thickness, the end of said member being bent into perpendicularity to the axis of the vehicle, a rigid bumper bar mounted on the bent end of the bumper support, a clamp gripping such support and supporting the bumper bar, and means for locking the clamp in position on the bar and on the support, there being separate means for holding the clamp and the bumper bar in a fixed relation.

11. In an automobile bumper, the combination with a forwardly extending flat supporting member having a laterally bent extension, of a clamp adapted to frictionally engage such extension and separate means for supporting a bumper bar thereon.

12. In an automobile bumper, the combination with a forwardly extending flat supporting member having a laterally bent extension, of a clamp adapted to frictionally engage such extension and separate means for supporting a bumper bar thereon, the clamp being adapted to conform to the contour of the bumper bar.

13. In an automobile bumper, the combination with a forwardly extending flat supporting member having a laterally bent extension, of a clamp adapted to frictionally engage such extension and means for supporting a bumper bar thereon, the clamp being adapted to conform to the contour of the bumper bar, the clamp being substantially U shaped, adapted to penetrate within the bumper bar and to surround the outside of the support.

14. In an automobile bumper, the combination with a forwardly extending flat supporting member having a laterally bent extension, of a clamp adapted to frictionally engage such extension and means for supporting a bumper bar thereon, the clamp being substantially U shaped, adapted to penetrate within the bumper bar and to surround the outside of the support.

15. A clamp for automobile bumper bars comprising a loop member adapted to surround the bumper bar, and to engage and surround a bumper support, and means for locking the clamp in holding position on both the bumper bar and the support.

16. A clamp for automobile bumper bars comprising a loop member adapted to surround and conform to the contour of the bumper bar, and separately to surround and conform to the contour of a bumper support, and means for locking the clamp in holding position both on the bumper bar and the support.

17. A clamp for automobile bumper bars comprising a loop member adapted to surround and conform to the contour of the bumper bar and also to separately conform to and surround a bumper support, and single means for locking the clamp in holding position both on the bumper bar and the support.

18. A clamp for automobile bumper bars comprising a loop member adapted to surround and conform to the contour of the bumper bar and also to separately conform to and surround a bumper support, and single means for locking the clamp in holding position both on the bumper bar and the support, comprising means for compressing the clamp against both bar and support.

19. In an automobile bumper, the combination with a forwardly extending flat supporting member having a laterally bent extension, of a clamp adapted frictionally to engage such extension, and means for supporting a bumper bar thereon, the clamp being adapted to engage and to conform to a substantial portion of the surface of the bumper bar adjacent the point of attachment to the supporting member.

Signed at Chicago county of Cook and State of Illinois, this 31st day of March, 1920.

LEWIS P. HALLADAY.